United States Patent
Nakazawa

(10) Patent No.: US 9,979,293 B2
(45) Date of Patent: May 22, 2018

(54) POWER SOURCE APPARATUS HAVING SWITCHING REGULATORS OPPOSITE IN PHASE

(71) Applicant: FUJITSU LIMITED, Kawasaki-shi, Kanagawa (JP)

(72) Inventor: Shigeaki Nakazawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/425,016

(22) Filed: Feb. 6, 2017

(65) Prior Publication Data
US 2017/0244322 A1 Aug. 24, 2017

(30) Foreign Application Priority Data
Feb. 23, 2016 (JP) .................. 2016-032405

(51) Int. Cl.
*H02M 3/158* (2006.01)
*H02M 3/156* (2006.01)
*H02M 1/00* (2006.01)

(52) U.S. Cl.
CPC .......... *H02M 3/158* (2013.01); *H02M 3/1563* (2013.01); *H02M 2001/008* (2013.01)

(58) Field of Classification Search
CPC ... H02M 2001/008; H02M 2003/1563; H02M 3/1563
See application file for complete search history.

(56) References Cited

U.S. PATENT DOCUMENTS

| 2001/0015639 A1* | 8/2001 | Aas ...................... H02M 1/084 323/282 |
| 2004/0070382 A1 | 4/2004 | Walters et al. |
| 2007/0139023 A1* | 6/2007 | Hasegawa ............. H02M 3/158 323/271 |

FOREIGN PATENT DOCUMENTS

| JP | 2004-096921 | 3/2004 |
| JP | 2005-124389 | 5/2005 |
| JP | 2007-202281 | 8/2007 |

* cited by examiner

*Primary Examiner* — Harry Behm
(74) *Attorney, Agent, or Firm* — Fujitsu Patent Center

(57) ABSTRACT

A power source apparatus includes a power input terminal to which input direct-current power is input from a power source; a first switching regulator coupled to the power input terminal and configured to supply, to a first electronic component, first direct-current power obtained by converting a voltage of the input direct-current power into a first voltage; a second switching regulator coupled to the power input terminal and configured to supply, to a second electronic component, second direct-current power obtained by converting the voltage of the input direct-current power into a second voltage; and a signal generating circuit configured to generate, based on a first oscillation voltage of the first switching regulator, a reference signal to be a reference of a timing of switching the second switching regulator such that the first oscillation voltage and a second oscillation voltage of the second switching regulator become opposite in phase.

4 Claims, 10 Drawing Sheets

POWER SOURCE APPARATUS HAVING SWITCHING REGULATORS OPPOSITE IN PHASE

CROSS-REFERENCE TO RELATED APPLICATION

This application is based upon and claims the benefit of priority of the prior Japanese Patent Application No. 2016-032405, filed on Feb. 23, 2016 the entire contents of which are incorporated herein by reference.

FIELD

The embodiments discussed herein relate to a power source apparatus.

BACKGROUND

A power source apparatus, which includes a first power source circuit, is known in the related art (for example, see patent document 1). The first power source circuit includes a series circuit of a first switching element and a first inductor coupled to a power source and includes a series circuit of a first capacitor and a rectifier element coupled to the first switching element in parallel. A first load is coupled to the first capacitor. The power source apparatus further includes a second power source circuit that is coupled to the first capacitor. The second power source circuit includes a second switching element and converts output voltage to a second load to which electric power is supplied by switching of the second switching element.

When supplying electric power to the first load, the power source apparatus operates only the first switching element to convert the voltage of the power source to supply the electric power to the first load. When supplying electric power to the first load, the power source apparatus does not operate the second switching element and does not supply the electric power to the second load. When supplying electric power to the second load, the power source apparatus operates the second switching element to convert the voltage of the power source to supply the electric power to the second load. When supplying the electric power to the second load, the power source apparatus turns off the first switching element and uses the first inductor and the first capacitor of the first power source circuit to eliminate noise generated in the second power source circuit.

However, in the above power source apparatus, when only one of the first power source circuit and the second power source circuit is operated, the other inductor and capacitor cannot be used. Thus, in order to take measures against the noise in an input unit that inputs electric power to the first power source circuit and the second power source circuit, it is required to apply measures against the noise to the respective power source circuits.

RELATED-ART DOCUMENTS

Patent Documents

[Patent Document 1] Japanese Laid-open Patent Publication No. 2004-096921

SUMMARY

According to an aspect of the embodiments, a power source apparatus includes a power input terminal to which input direct-current power is input from a power source; a first switching regulator coupled to the power input terminal and configured to supply, to a first electronic component, first direct-current power obtained by converting a voltage of the input direct-current power into a first voltage; a second switching regulator coupled to the power input terminal and configured to supply, to a second electronic component, second direct-current power obtained by converting the voltage of the input direct-current power into a second voltage; and a signal generating circuit configured to generate, based on a first oscillation voltage of the first switching regulator, a reference signal to be a reference of a timing of switching the second switching regulator such that the first oscillation voltage of the first switching regulator and a second oscillation voltage of the second switching regulator become opposite in phase.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENT

Hereinafter, embodiments to which a power source apparatus of the present invention is applied will be described.

<First Embodiment>

Figure 1:
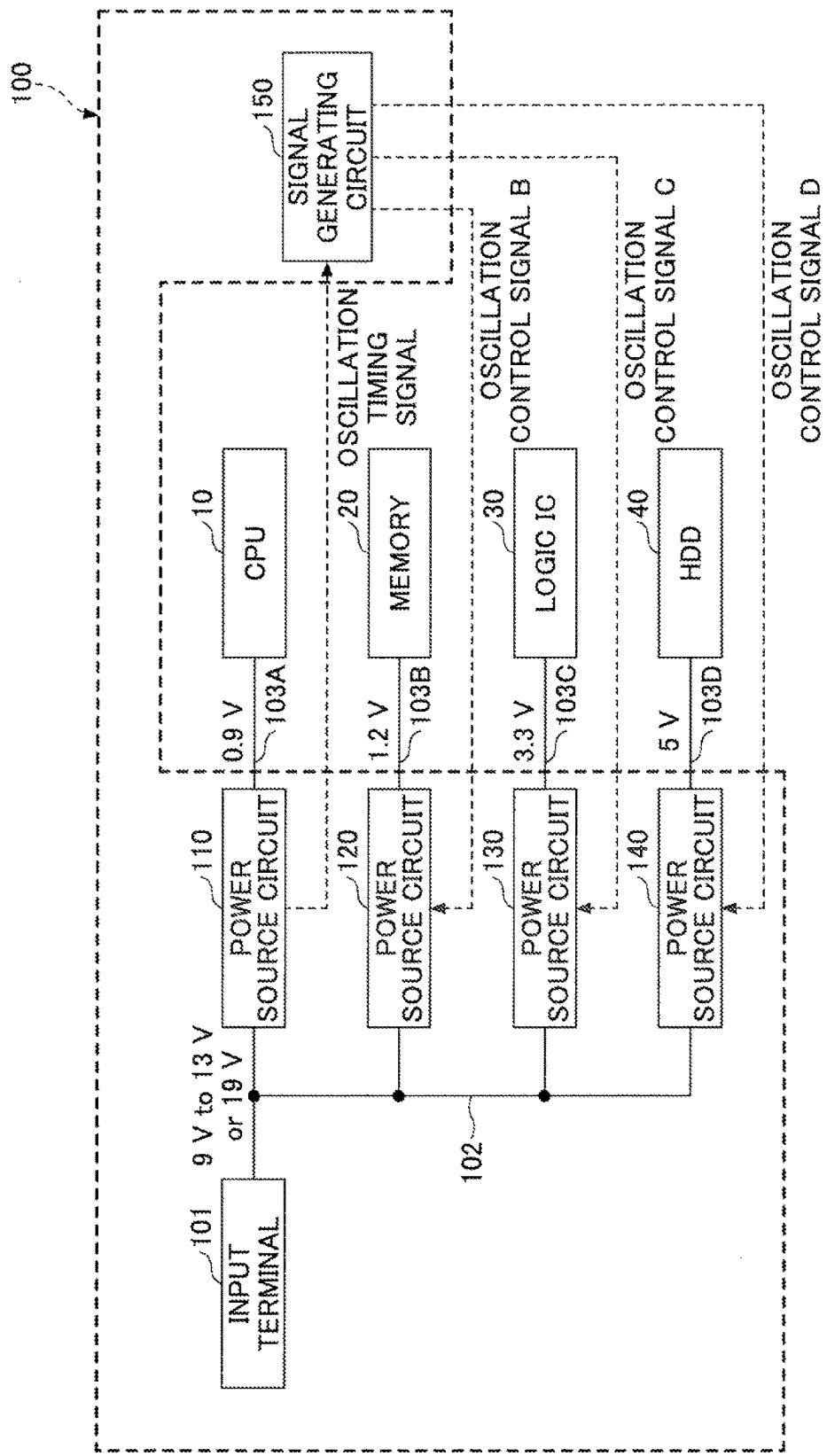
FIG. 1 is a diagram illustrating a power source apparatus 100 according to a first embodiment.

FIG. 1 is a diagram illustrating a power source apparatus 100 according to a first embodiment.

The power source apparatus 100 includes an input terminal 101, power source circuits 110, 120, 130, and 140, and a signal generating circuit 150. A Central Processing Unit (CPU) 10, a memory 20, a logic Integrated Circuit (IC) 30, and a Hard Disk Drive (HDD) 40 are coupled to the power source circuits 110, 120, 130, and 140 respectively. In FIG. 1, thin dash lines represent signal lines.

For example, the power source apparatus 100 is mounted on a notebook Personal Computer (PC). Inside the notebook PC, the power source apparatus 100 is mounted on a mother board (interconnection substrate) together with the CPU 10, the memory 20, the logic IC 30, and the HDD 40.

The CPU 10, the memory 20, the logic IC 30, and the HDD 40 can be divided into 2 groups. The CPU 10 is classified into a first group. The memory 20, the logic IC 30, and the HDD 40 are classified into a second group. Power consumption of the CPU is largest. Power consumption of each of the memory 20, the logic IC 30, and the HDD 40 is less than that of the CPU 10. The CPU 10 is an example of a first electronic component that is included in the notebook PC. The memory 20, the logic IC 30, and the HDD 40 are examples of a second electronic component that is included in the notebook PC.

The input terminal 101 is a terminal (power input terminal) to which a battery or an Alternating Current (AC) adapter is coupled. Direct Current (DC) power is input to the terminal from the battery or the AC adapter. For example, depending on a degree of charging the battery, a voltage of the DC power that is input from the battery is between 9 V to 13V. Further, a voltage of the DC power that is input from the AC adapter is 19 V, for example.

The power source circuits 110, 120, 130, and 140 are coupled to the input terminal 101 via a wiring 102. The wiring 102 is a wiring of the mother board. The wiring 102 branches from the input terminal 101 and is coupled to the power source circuits 110, 120, 130, and 140. Thus, the power source circuits 110, 120, 130, and 140 are coupled to the input terminal 101 in parallel with each other.

The power source circuit 110 converts DC power, input from the input terminal 101 via the wiring 102, into DC power of 0.9 V and supplies the converted DC power to the CPU 10. The power source circuit 110 and the CPU 10 are coupled via a wiring 103A. The wiring 103A is a wiring of the mother board. The power source circuit 110 is an example of a first switching regulator. The power source circuit 110 may supply, to the CPU 10, first DC electric power obtained by converting the voltage of the input DC electric power from the input terminal 101.

The power source circuit 120 converts DC power, input from the input terminal 101 via the wiring 102, into DC power of 1.2 V and supplies the converted DC power to the memory 20. The power source circuit 120 and the memory 20 are coupled via a wiring 103B. The wiring 103B is a wiring of the mother board. The power source circuit 120 is an example of a second switching regulator. The power source circuit 120 may supply, to the memory 20, second DC electric power obtained by converting the voltage of the input DC electric power from the input terminal 101.

The power source circuit 130 converts DC power, input from the input terminal 101 via the wiring 102, into DC power of 3.3 V and supplies the converted DC power to the logic IC 30. The power source circuit 130 and the logic IC 30 are coupled via a wiring 103C. The wiring 103C is a wiring of the mother board. The power source circuit 130 is an example of a second switching regulator.

The power source circuit 140 converts DC power, input from the input terminal 101 via the wiring 102, into DC power of 5 V and supplies the converted DC power to the HDD 40. The power source circuit 140 and the HDD 40 are coupled via a wiring 103D. The wiring 103D is a wiring of the mother board. The power source circuit 140 is an example of a second switching regulator.

An oscillation timing signal based on an oscillation voltage of the power source circuit 110 is input to the signal generating circuit 150. The signal generating circuit 150 outputs oscillation control signals B, C, and D to the power source circuits 120, 130, and 140, respectively. The signal generating circuit 150 generates, based on the oscillation timing signal, the oscillation control signals B, C, and D to be references of timings of switching the power source circuits 120, 130, and 140 such that the oscillation voltage of the power source circuit 110 and the oscillation voltages of the power source circuits 120, 130, and 140 become opposite in phase.

The signal generating circuit 150 is an example of a signal generating circuit. The oscillation control signals B, C, and D are examples of a reference signal. The oscillation voltage of the power source circuit 110 is an example of a first oscillation voltage. The oscillation voltages of the power source circuits 120, 130, and 140 are examples of a second oscillation voltage.

The oscillation voltage of the power source circuit 110 and the oscillation voltages of the power source circuits 120, 130, and 140 will be described below.

Figure 2:
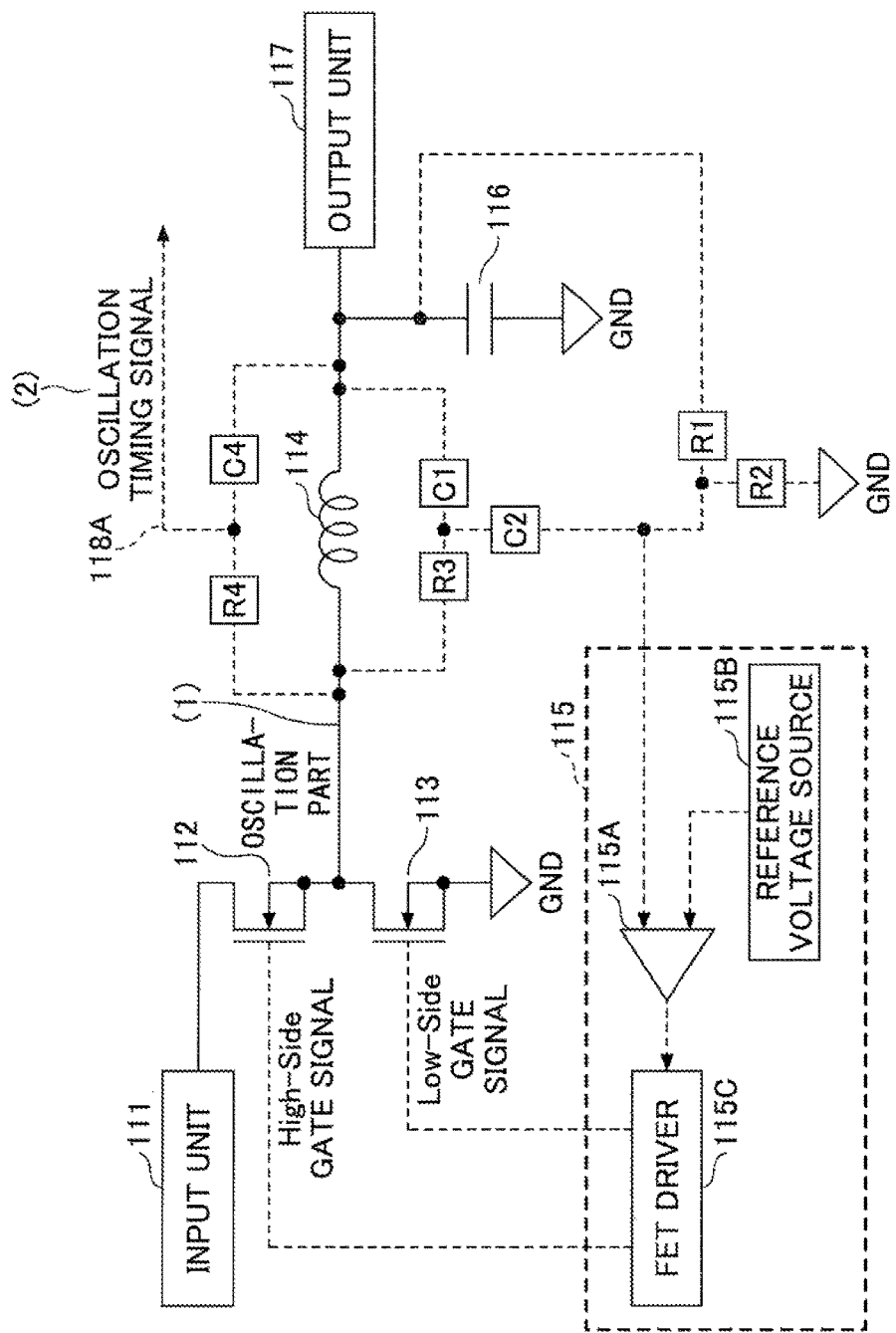
FIG. 2 is a diagram illustrating a configuration of a power source circuit 110 according to the first embodiment.

FIG. 2 is a diagram illustrating a configuration of the power source circuit 110.

The power source circuit 110 includes an input unit 111, Field Effect Transistors (FET) 112 and 113, a coil 114, a control IC 115, an output capacitor (condenser) 116, an output unit 117, a wiring 118A, resistors R1, R2, R3, and R4, and capacitors (condensers) C1, C2, and C4. In FIG. 2, thin dash lines represent signal lines.

The input unit 111 is coupled to the wiring 102 (see FIG. 1). The DC power is input to the input unit 111 via the wiring 102. For example, the input unit 111 is a wiring of the mother board and extends to a drain of the FET 112. Here, it is denoted as the input unit 111 for convenience of description.

The FET 112 includes the drain coupled to the input unit 111, a source coupled to the drain of the FET 113, and a gate coupled to the control IC 115. For example, the FET 112 is an N-type Metal Oxide Field Effect Transistor (NMOSFET). The FET 112 is a high side FET and is switched on/off when a voltage value of the DC power that is output from the output unit 117 is increased.

The FET 113 includes the drain coupled to the source of the FET 112, a source coupled to ground (GND), and a gate coupled to the control IC 115. For example, the FET 113 is an NMOSFET. The FET 113 is a low side FET and is switched on/off when a voltage value of the DC power that is output from the output unit 117 is decreased.

The coil 114 is disposed between the output unit 117 and a coupling point of the source of the FET 112 and the drain of the FET 113. An oscillation part of the power source circuit 110 is between the coil 114 and the coupling point of the source of the FET 112 and the drain of the FET 113. A voltage that is generated in the oscillation part is an oscillation voltage of the power source circuit 110.

The resistor R4 and the capacitor C4 are coupled in parallel with the coil 114. The wiring 118A, which branches from a coupling point of the resistor R4 and the capacitor C4, is a wiring for extracting the oscillation timing signal.

Further, the resistor R3 and the capacitor C1 are coupled in parallel with the coil 114. The capacitor C2 and the resistor R1 are coupled in series between the output unit 117 and the coupling point of the resistor R3 and the capacitor C1.

One end (upper side terminal in FIG. 2) of the resistor R2 is coupled to a line branched from between the capacitor C2 and the resistor R1. The other end of the resistor R2 is coupled to ground (GND). One input terminal (upper side in FIG. 2) of a comparator 115A of the control IC 115 is coupled between the capacitor C2 and the resistor R1.

The control IC 115 includes the comparator 115A, a reference voltage source 115B, and a FET driver 115C.

One input terminal (upper side in FIG. 2) of the comparator 115A is coupled between the capacitor C2 and the resistor R1. The other input terminal (lower side in FIG. 2) of the comparator 115A is coupled to the reference voltage source 115B. Further, an output terminal of the comparator 115A is coupled to the FET driver IC 115C. An output voltage of the power source circuit 110 output from the output unit 117 is fed back and input to one input terminal (upper side in FIG. 2) of the comparator 115A.

The comparator 115A compares the output voltage fed back to one input terminal (upper side in FIG. 2) with a reference voltage input to the other input terminal (lower side in FIG. 2), and outputs an output signal representing a comparison result to the FET driver IC 115C. The output signal of the comparator 115A represents the comparison result obtained by comparing the output voltage, which is fed back, and the reference voltage.

The reference voltage source 115B outputs the reference voltage to be input to the other input terminal (lower side in FIG. 2) of the comparator 115A.

The FET driver IC 115C outputs a High-Side gate signal and a Low-Side gate signal based on the output signal of the comparator 115A. The High-Side gate signal is input to the gate of the FET 112. The Low-Side gate signal is input to the gate of the FET 113.

In a case where the output signal represents that the output voltage of the comparator 115A is lower than the reference voltage, the FET driver IC 115C drives the FET 112 by using the High-Side gate signal. In a case where the output signal represents that the output voltage of the comparator 115A is higher than the reference voltage, the FET driver IC 115C drives the FET 113 by using the Low-Side gate signal. In this way, the FET driver IC 115C performs feedback control such that the output voltage of the power source circuit 110, which is output from the output unit 117 to one input terminal (upper side in FIG. 2) of the comparator 115A, becomes equal to the reference voltage that is output from the reference voltage source 115B.

The output capacitor 116 is provided in order to smooth a voltage of electric power that is output from the coil 114.

The output unit 117 is coupled to the CPU (see FIG. 1). The output unit 117 outputs, to the CPU 10, DC power that is output from the coil 114 and whose voltage value is smoothed by the output capacitor 116.

Figure 3:
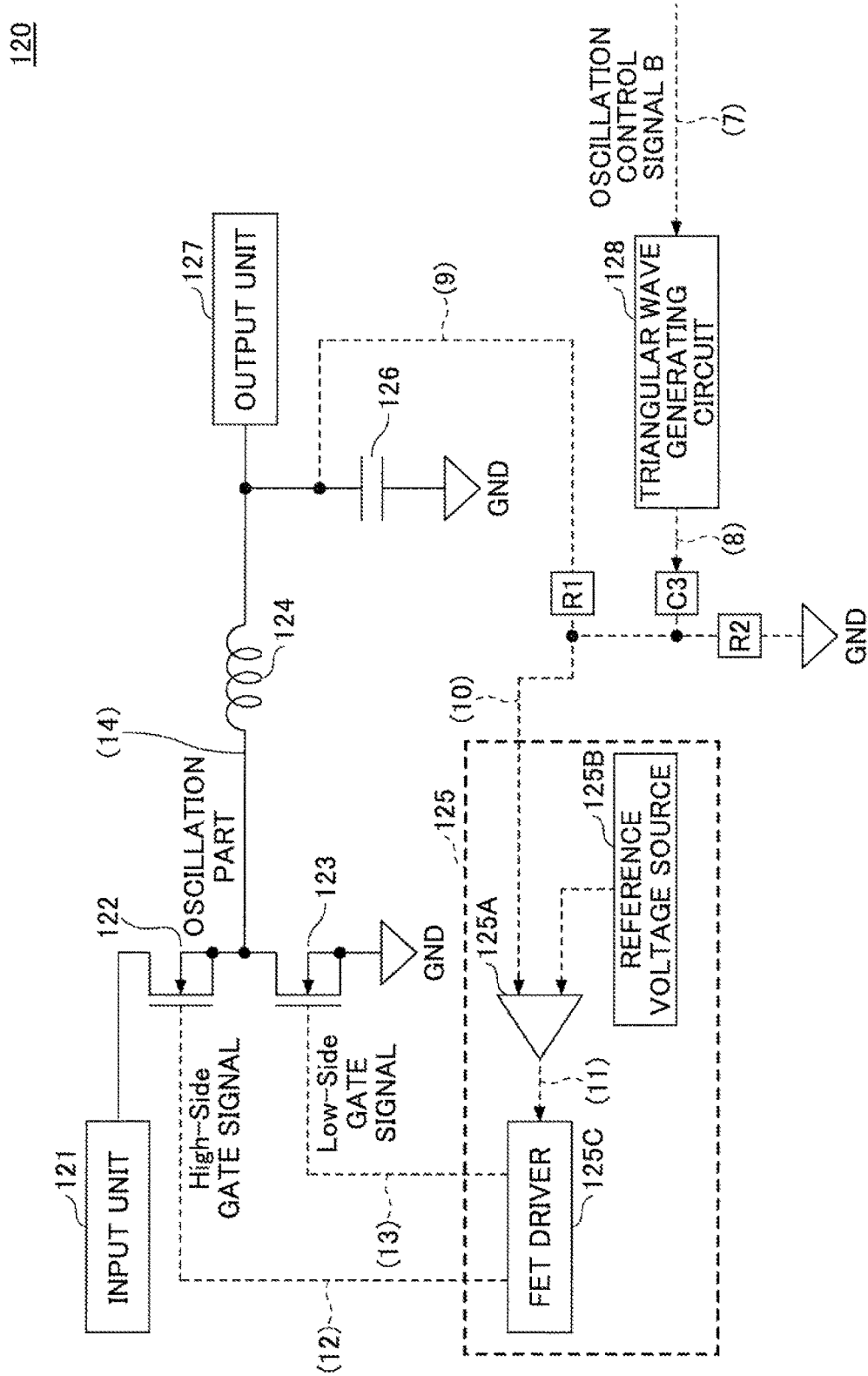
FIG. 3 is a diagram illustrating a configuration of a power source circuit 120 according to the first embodiment.

FIG. 3 is a diagram illustrating a configuration of the power source circuit 120.

The power source circuit 120 includes an input unit 121, Field Effect Transistors (FET) 122 and 123, a coil 124, a control IC 125, an output capacitor (condenser) 126, an output unit 127, a triangular wave generating circuit 128, resistors R1 and R2, and a capacitor (condenser) C3. The resistors R1 and R2 and the capacitor C3 in FIG. 3 are respectively similar to the resistors R1 and R2 and the capacitor C3 of the power source circuit 110 (see FIG. 2). In FIG. 3, thin dash lines represent signal lines.

The input unit 121 is coupled to the wiring 102 (see FIG. 1). The DC power is input to the input unit 121 via the wiring 102. For example, the input unit 121 is a wiring of the mother board and extends to a drain of the FET 122. Here, it is denoted as the input unit 121 for convenience of description.

The FET 122 includes the drain coupled to the input unit 121, a source coupled to a drain of the FET 123, and a gate coupled to the control IC 125. For example, the FET 122 is an NMOSFET. The FET 122 is a high side FET and is switched on/off when a voltage value of the DC power that is output from the output unit 127 is increased.

The FET 123 includes the drain coupled to the source of the FET 122, a source coupled to ground (GND), and a gate coupled to the control IC 125. For example, the FET 123 is an NMOSFET. The FET 123 is a low side FET and is switched on/off when a voltage value of the DC power that is output from the output unit 127 is decreased.

The coil 124 is disposed between the output unit 127 and a coupling point of the source of the FET 122 and the drain of the FET 123. An oscillation part of the power source circuit 120 is between the coil 124 and the coupling point of the source of the FET 122 and the drain of the FET 123. A voltage that is generated in the oscillation part is an oscillation voltage of the power source circuit 120.

The control IC 125 includes a comparator 125A, a reference voltage source 125B, and a FET driver 125C.

One input terminal (upper side in FIG. 3) of the comparator 125A is coupled to the output unit 127 via the resistor R1. The other input terminal (lower side in FIG. 3) of the comparator 125A is coupled to the reference voltage source 125B. Here, one end (upper side terminal in FIG. 3) of the resistor R2 is coupled between one input terminal (upper side in FIG. 3) of the comparator 125A and the resistor R1. The other end of the resistor R2 (lower side terminal in FIG. 3) is coupled to ground (GND).

An output terminal of the comparator 125A is coupled to the FET driver 125C. An output voltage of the power source circuit 120 output from the output unit 127 is fed back and input to one input terminal (upper side in FIG. 3) of the comparator 125A.

The comparator 125A compares the output voltage fed back to one input terminal (upper side in FIG. 3) with a reference voltage input to the other input terminal (lower side in FIG. 3), and outputs an output signal representing a comparison result to the FET driver 125C.

In a case where the output voltage fed back to one input terminal (upper side in FIG. 3) is lower than the reference voltage input to the other input terminal (lower side in FIG. 3), the comparator 125A outputs a pulse of H level. A pulse width of H level of the output signal of the comparator 125A becomes a duty ratio of a High-Side gate signal that the FET driver 125C outputs.

The reference voltage source 125B outputs a reference voltage to be input to the other input terminal (lower side in FIG. 3) of the comparator 125A.

The FET driver 125C outputs a High-Side gate signal and a Low-Side gate signal to which the duty ratio is set based on the output signal of the comparator 125A. The High-Side gate signal is input to the gate of the FET 122. The Low-Side gate signal is input to the gate of the FET 123. The Low-Side gate signal has a signal level obtained by inverting the High-Side gate signal.

The FET driver 125C drives the FET 122 and the FET 123 by using the High-Side gate signal and the Low-Side gate signal generated based on the output voltage of the comparator 125A, respectively.

In this way, the FET driver 125C performs feedback control such that the output voltage of the power source circuit 120, which is output from the output unit 127 to one input terminal (upper side in FIG. 3) of the comparator 125A, becomes equal to the reference voltage that is output from the reference voltage source 125B. For example, the output voltage of the power source circuit 120 is 1.2 V (see FIG. 1).

The output capacitor 126 is provided in order to smooth a voltage of electric power that is output from the coil 124.

The output unit 127 is coupled to the memory 20 (see FIG. 1). The output unit 127 outputs, to the memory 20, DC power that is output from the coil 124 and whose voltage value is smoothed by the output capacitor 126.

The oscillation control signal B is input to the triangular wave generating circuit 128. The output unit 127 outputs a voltage signal, whose voltage value changes in triangular waves, in accordance with the oscillation control signal B. Thus, an input terminal (right side in FIG. 3) of the triangular wave generating circuit 128 is coupled to an output terminal of the signal generating circuit 150 (see FIG. 1). Further, an output terminal (left side in FIG. 3) of the triangular wave generating circuit 128 is coupled, via the capacitor C3, to one input terminal (upper side in FIG. 3) of the comparator 125A, a lower voltage side terminal (left side terminal in FIG. 3) of the resistor R1, and a higher voltage side terminal (upper side terminal in FIG. 3) of the resistor R2.

The triangular wave generating circuit 128 inputs, to one input terminal (upper side in FIG. 3) of the comparator 125A, the voltage signal whose voltage value changes in triangular waves.

Here, configurations of the power source circuits 130 and 140 are similar to that of the power source circuit 120. Instead of the oscillation control signal B, the oscillation control signals C and D are respectively input to the power source circuits 130 and 140. The power source circuits 130 and 140 output DC power to the logic IC 30 and the HDD 40. The oscillation control signals B, C, and D are examples of reference signals to be references of timings of switching in the power source circuits 120, 130 and 140, respectively.

Voltages that are generated in oscillation parts of the power source circuits 130 and 140 are oscillation voltages of the power source circuits 130 and 140, respectively.

Figure 4:
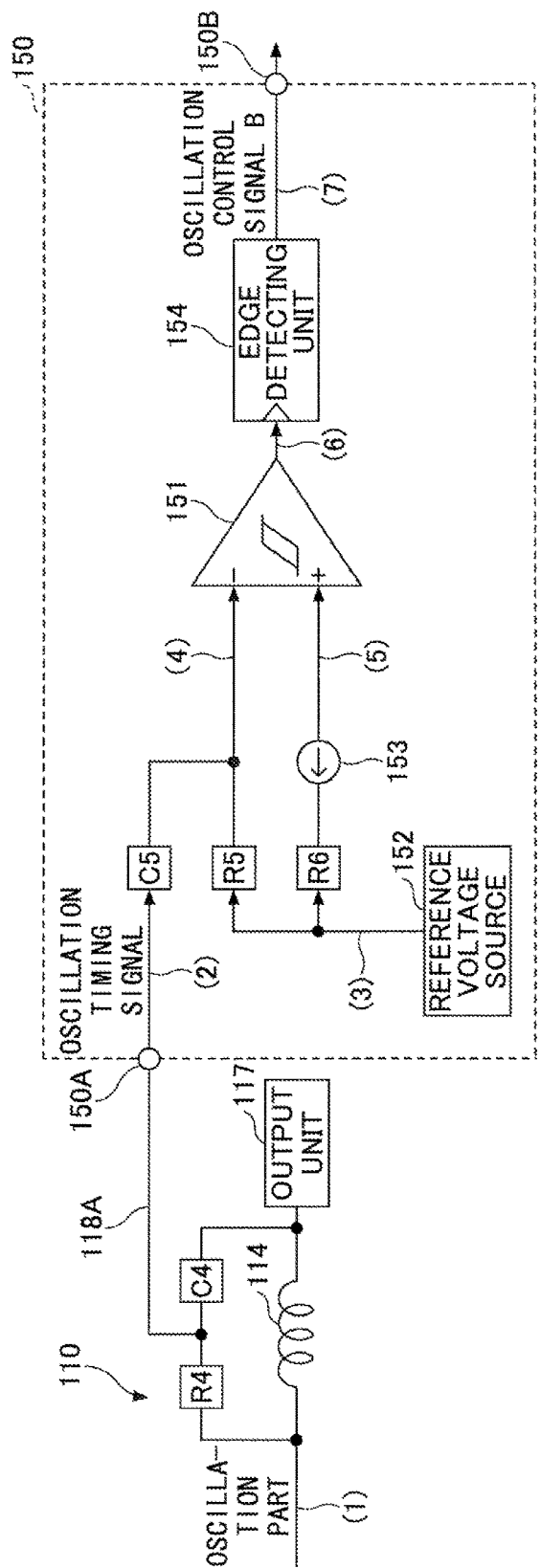
FIG. 4 is a diagram illustrating a configuration of a signal generating circuit 150 according to the first embodiment.

FIG. 4 is a diagram illustrating a configuration of the signal generating circuit 150. Although three signal generating circuits 150 are provided for the respective power source circuits 120, 130, and 140 in practice, the signal generating circuit 150 coupled to the power source circuit 120 is described here because the three signal generating circuits 150 have the similar configuration.

The signal generating circuit 150 includes an input unit 150A, a comparator 151, a reference voltage source 152, a constant current source 153, an edge detecting unit 154, an output unit 150B, resistors R5 and R6, and a capacitor (condenser) C5.

The input unit 150A is a part to which the oscillation timing signal is input from the power source circuit 110. The input unit 150A is a part of a wiring of the mother board illustrated as the wiring 118A on the power source circuit 110 side. The input unit 150A is coupled to the capacitor C5 inside the signal generating circuit 150.

The comparator 151 is a comparator with hysteresis and is an example of a hysteresis comparator. An inverting input terminal (−) of the comparator 151 is coupled to the input unit 150A via the capacitor C5 and is coupled to the reference voltage source 152 via the resistor R5. Further, a non-inverting input terminal (+) of the comparator 151 is coupled to the reference voltage source 152 via the constant current source 153 and the resistor R6.

The comparator 151 compares levels of signals that are input to the inverting input terminal (−) and the non-inverting input terminal (+), and outputs, to the edge detecting unit 154, an output signal. In other words, the comparator 151 may compare a voltage that is in accordance with the oscillation voltage of the power source circuit 110 with the reference voltage of the reference voltage source 152.

The reference voltage source 152 outputs a predetermined reference voltage.

The constant current source 153 is provided between the non-inverting input terminal (+) of the comparator 151 and the resistor R6. Here, the constant current source 153 is directed to left in order to make an electric potential of the non-inverting input terminal (+) higher than an electric potential of a right side terminal of the resistor R6. The constant current source 153 and the resistor R6 are an example of an increasing unit that increases a voltage value of the reference voltage by a value corresponding to half of a pulse width of the oscillation voltage of the power source circuit 120.

A voltage value, which is obtained by multiplying output current of the constant current source 153 by a resistance value of the resistor R6, is set to be a value corresponding to the half (0.6 V) of the output voltage (1.2 V) of the power source circuit 120. The reason of this will be described later below.

The edge detecting unit 154 detects a rising edge included in the output voltage of the comparator 151 to output a pulse signal of H level at the timing of rising. The pulse signals that the edge detecting units 154 output are supplied to the power source circuits 120, 130, and 140 as the oscillation control signals B, C, and D, respectively. A pulse width of the H level of the pulse signal that the edge detecting unit 154 outputs is significantly short and instantaneously falls to L level. In other words, the edge detecting unit 154 may detect the edge of the output of the comparator 151 when the voltage that is in accordance with the oscillation voltage of the power source circuit 110 decreases.

The output unit 150B is a part from which the signal generating circuit 150 outputs the oscillation control signal B, C, or D, and is an example of wiring of the mother board. Here, the part of the wiring of the mother board is denoted as the output unit 150B for convenience of description.

The signal generating circuit 150 as described above is coupled to the power source circuit 120. As described above, three signal generating circuits 150 are provided in practice, and the signal generating circuits 150 are respectively coupled to the power source circuits 130 and 140 as well.

In the signal generating circuit 150 coupled to the power source circuit 130, a voltage value, which is obtained by multiplying output current of the constant current source 153 by a resistance value of the resistor R6, is set to be a value corresponding to the half of the output voltage (3.3 V) of the power source circuit 130.

Further, In the signal generating circuit 150 coupled to the power source circuit 140, a voltage value, which is obtained by multiplying output current of the constant current source 153 by a resistance value of the resistor R6, is set to be a value corresponding to the half of the output voltage (5 V) of the power source circuit 140.

Figure 5:
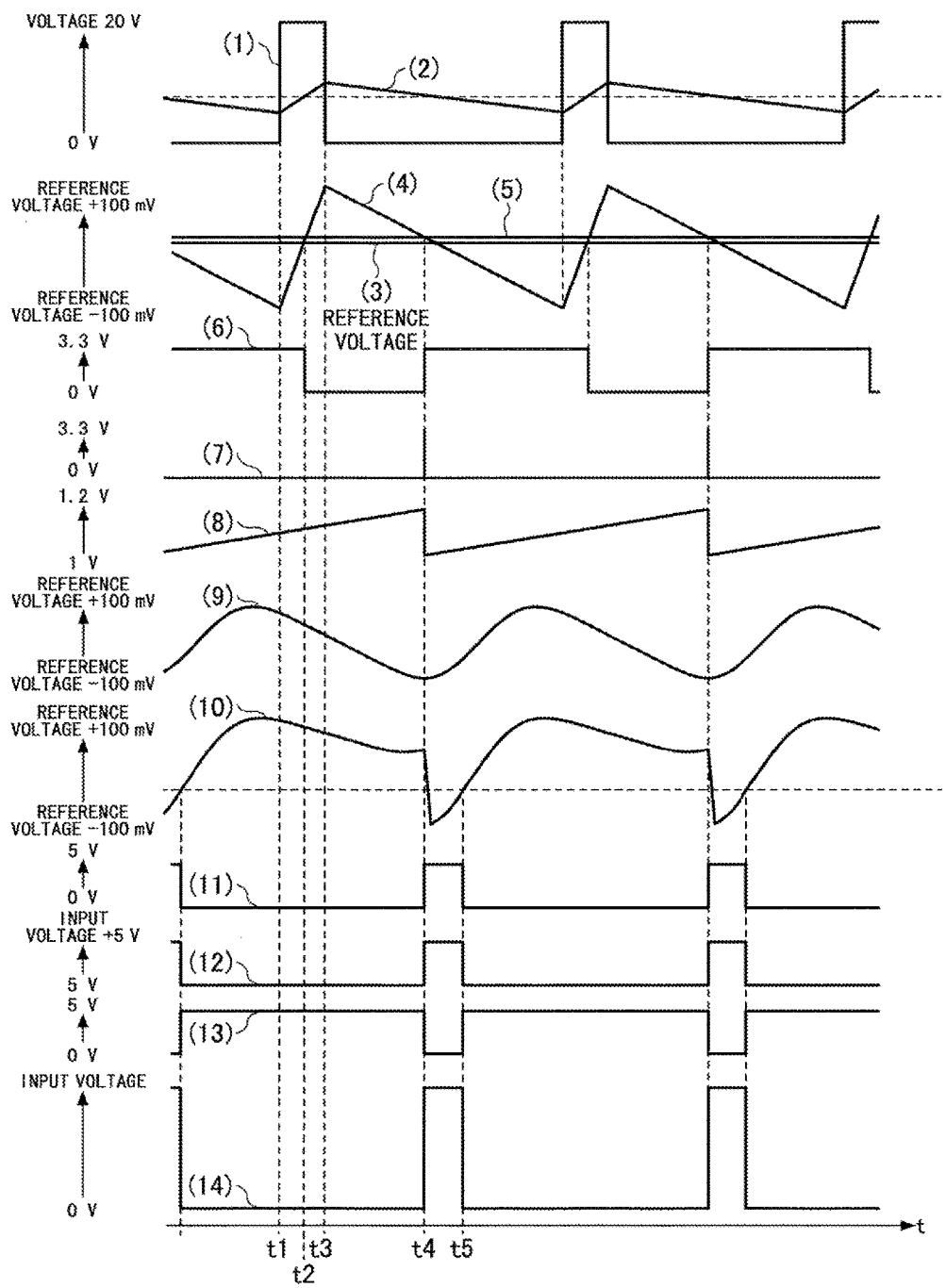
FIG. 5 is a timing chart illustrating operation realized by the power source circuit 110, the power source circuit 120, and the signal generating circuit 150 of the power source apparatus 100 according to the first embodiment.

FIG. 5 is a timing chart illustrating operation realized by the power source circuit 110, the power source circuit 120, and the signal generating circuit 150 in the power source apparatus 100. Signals (1) to (14) illustrated in FIG. 5 are the signals (1) to (14) illustrated in FIG. 2 to FIG. 4.

Specifically, the signal (1) represents a voltage waveform of the oscillation part of the power source circuit 110 (see FIG. 2). The signal (2) represents a voltage waveform of the oscillation timing signal (see FIG. 2). The signal (3) represents a voltage waveform of the reference voltage source 152 (see FIG. 4). The signal (4) represents a voltage waveform of the input signal of the inverting input terminal (−) of the comparator 151 (see FIG. 4). The signal (5) represents a voltage waveform of the input signal of the non-inverting input terminal (+) of the comparator 151 (see FIG. 4).

The signal (6) represents a voltage waveform of the output signal of the comparator 151 (see FIG. 4). The signal (7) represents a voltage waveform of the oscillation control signal B (see FIGS. 1 and 3).

The signal (8) represents a voltage waveform of the output voltage of the triangular wave generating circuit 128 (see FIG. 3). The signal (9) represents a voltage waveform of the DC power that is output from the output unit 127 of the power source circuit 120 (see FIG. 3). The signal (10) represents a waveform of the voltage that is input to one input terminal (upper side in FIG. 3) of the comparator 125A (see FIG. 3).

The signal (11) represents a voltage waveform of the output signal of the comparator 125A (see FIG. 3). The signal (12) represents a voltage waveform of the High-Side gate signal that is input to the gate of the FET 122 from the FET driver 125C (see FIG. 3).

The signal (13) represents a voltage waveform of the Low-Side gate signal that is input to the gate of the FET 123 from the FET driver 125C (see FIG. 3). The signal (14) represents a voltage waveform of the oscillation part of the power source circuit 120 (see FIG. 2).

Although the power source circuits 130 and 140 output signals similar to the signals (8) to (14), differences with a case of using the power source circuit 120 will described below.

In the following, the signals (1) to (5) are respectively referred to as the oscillation voltage (1) of the power source circuit 110, the oscillation timing signal (2), the voltage (3) of the reference voltage source 152, the input signal (4) of the inverting input terminal (−) of the comparator 151, and the input signal (5) of the non-inverting input terminal (+) of the comparator 151.

Further, the signals (6) to (11) are respectively referred to as the output signal (6) of the comparator 151, the oscillation control signal (7), the output voltage (8) of the triangular wave generating circuit 128, the output voltage (9) of the power source circuit 120, the one input voltage (10) of the comparator 125A, and the output signal (11) of the comparator 125A.

Further, the signals (12) to (14) are respectively referred to as the High-Side gate signal (12), the Low-Side gate signal (13), and the oscillation voltage (14) of the power source circuit 120.

A level of the input signal (5) of the non-inverting input terminal (+) of the comparator 151 is a value obtained by adding a voltage value, which is obtained by multiplying the output current of the constant current source 153 by the resistance value of the resistor R6, to the voltage (3) of the reference voltage source 152.

Further, the voltage value, which is obtained by multiplying the output current of the constant current source 153 by the resistance value of the resistor R6, is set to be a value corresponding to the half (0.6 V) of the output voltage (1.2 V) of the power source circuit 120.

This is because of the following reason. Timings, at which the oscillation timing signal (2) crosses the output voltage of the power source circuit 110 illustrated by a broken line, are equal to timings at which the input signal (4) of the inverting input terminal (−) of the comparator 151 crosses the voltage (3) of the reference voltage source 152.

Then, the centers of the pulse widths of the oscillation voltage (1) of the power source circuit 110 correspond to timings at which the oscillation timing signal (2) exceeds the output voltage of the power source circuit 110 illustrated by the broken line. According to the power source apparatus 100 of the first embodiment, it is desired that the timings of the centers of the pulse widths of the H level of the oscillation voltage (1) of the power source circuit 110 and the timings of the centers of the pulse widths of the H level of the oscillation voltage (14) of the power source circuit 120 are opposite in phase.

Thus, in order to detect the decrease of the input signal (4) of the inverting input terminal (−) of the comparator 151 at a timing moved forward by the half of the pulse width of the H level of the oscillation voltage (14) of the power source circuit 120 from a timing of becoming equal to the voltage (3) of the reference voltage source 152 when the input signal (4) of the inverting input terminal (−) of the comparator 151 decreases, a level of the input signal (5) of the non-inverting input terminal (+) of the comparator 151 is set to be a value obtained by adding, to the voltage (3) of the reference voltage source 152, the voltage value obtained by multiplying the output current of the constant current source 153 by the resistance value of the resistor R6.

FIG. 5 illustrates a scale for the oscillation voltage (1) of the power source circuit 110 and the oscillation timing signal (2) in a range from 0 V to 20 V.

Further, the level of the input signal (4) of the inverting input terminal (−) of the comparator 151 is obtained by superimposing the level of the oscillation timing signal (2) with the voltage (3) of the reference voltage source 152. The level of the oscillation timing signal (2) is equal to the DC power, which the power source circuit 110 outputs from the output unit 117, and the sinusoidal fluctuation is very small. Therefore, a range from a level (reference voltage−100 mV), which is lower than the voltage (3) of the reference voltage source 152 by 100 mV, to a level (reference voltage+100 mV), which is higher than the voltage (3) of the reference voltage source 152 by 100 mV, is illustrated for the level of the input signal (4) of the inverting input terminal (−) of the comparator 151.

Further, in scales illustrated for the output signal (6) of the comparator 151 and the oscillation control signal (7), H level is 3.3 V and L level is 0 V. A scale from 1 V to 1.2 V is illustrated for the output voltage (8) of the triangular wave generating circuit 128.

Scales from a level (reference voltage−100 mV), which is lower than the reference voltage of the reference voltage source 125 by 100 mV, to a level (reference voltage+100 mV), which is higher than the reference voltage of the reference voltage source 125B by 100 mV, are illustrated for the output voltage (9) of the power source circuit 120 and the one input voltage (10) of the comparator 125A.

Further, in a scale illustrated for the output signal (11) of the comparator 125A, H level is 5 V and L level is 0 V.

Further, the FETs 122 and 123 of the power source circuit 120 are driven by the High-Side gate signal (12) and the Low-Side gate signal (13) at the predetermined duty ratio. Thereby, the output voltage (9) of the power source circuit 120 has a sinusoidal voltage waveform as illustrated in FIG. 5.

Here, the scale from a level (reference voltage−100 mV), which is lower than the reference voltage of the reference voltage source 125B by 100 mV, to a level (reference voltage+100 mV), which is higher than the reference voltage of the reference voltage source 125B by 100 mV, is illustrated for the signal level of the output voltage (9) of the power source circuit 120. Because the output voltage (9) of the power source circuit 120 is smoothed by the output capacitor 126, its sinusoidal fluctuation is very small.

At time t1, the high side FET 112 is turned on, the low side FET 113 is turned off, and the oscillation voltage (1) of the power source circuit 110 rises up to H level. Then, the oscillation timing signal (2) starts to increase substantially linearly. Further, similar to the oscillation timing signal (2), the input signal (4) of the inverting input terminal (−) of the comparator 151 starts to increase substantially linearly at time t1 because the input signal (4) of the inverting input terminal (−) of the comparator 151 is a signal obtained by adding the voltage (3) of the reference voltage source 152 to the oscillation timing signal (2).

At time t1, the output signal (6) of the comparator 151 is in the H level because the level of the input signal (4) of the inverting input terminal (−) of the comparator 151 is lower than the level of the input signal (5) of the non-inverting input terminal (+) of the comparator 151.

When the level of the input signal (4) of the inverting input terminal (−) of the comparator 151 exceeds the level of the input signal (5) of the non-inverting input terminal (+) of the comparator 151 at time t2, the output signal (6) of the comparator 151 falls to the L level.

At time t3, the high side FET 112 is turned off, the low side FET 113 is turned on, and the oscillation voltage (1) of the power source circuit 110 falls to the L level. Then, the oscillation timing signal (2) starts to decrease substantially linearly. Thus, the oscillation timing signal (2) has a triangle voltage waveform. This is because the waveform of the oscillation voltage (1) of the power source circuit 110 is dulled by the resistor R4 and the capacitor C4.

Further, similar to the oscillation timing signal (2), the input signal (4) of the inverting input terminal (−) of the comparator 151 has a triangle voltage waveform.

Here, the broken line that represents the center of the level of the triangle oscillation timing signal (2) is a voltage value of the DC power that the power source circuit 110 outputs from the output unit 117.

When the level of the input signal (4) of the inverting input terminal (−) of the comparator 151 becomes lower than the level of the input signal (5) of the non-inverting input terminal (+) of the comparator 151 at time t4, the output signal (6) of the comparator 151 rises up to the H level.

At this time, because the rising to the H level is detected by the edge detecting unit 154, the oscillation control signal (7) becomes a pulse of the H level at time t4. The oscillation control signal (7) becomes the H level only at moments when the output signal (6) of the comparator 151 rises up to the H level.

The edge detecting unit 154 detects the edge of the rising of the output signal (6) of the comparator 151 to the H level at the timing moved forward, by the half of the pulse width of the H level of the oscillation voltage (14), from the timing at which the input signal (4) of the inverting input terminal (−) of the comparator 151 decreases to be equal the voltage (3) of the reference voltage source 152.

Further, because the triangular wave generating circuit 128 outputs the voltage in triangular wave by the pulse of the H level of the oscillation control signal (7), the output voltage (8) of the triangular wave generating circuit 128 starts to rise from the level at which the level of the triangle wave is lowest.

Further, the one input voltage (10) of the comparator 125A becomes a voltage waveform, which is obtained by superimposing the output voltage (8) of the triangular wave generating circuit 128 with the output voltage (9) of the power source circuit 120, and becomes lower than the reference voltage of the reference voltage source 125B at time t4. Here, the reference voltage of the reference voltage source 125B is illustrated by the broken line.

Thus, at time t4, the output signal (11) of the comparator 125A becomes the H level, and the FET driver 125C increases the High-Side gate signal (12) to the H level and decreases the Low-Side gate signal (13) to the L level. This is to increase the voltage value of the DC power that is output from the output unit 127.

As a result, at time t4, the oscillation voltage (14) of the power source circuit 120 rises up.

When the one input voltage (10) of the comparator 125A exceeds the reference voltage of the reference voltage source 125B at time t5, the output signal (11) of the comparator 125A falls to the L level. Thus, the FET driver 125C decreases the High-Side gate signal (12) to the L level and increases the Low-Side gate signal (13) to the H level. This is to decrease the voltage value of the DC power that is output from the output unit 127.

As a result, at time t5, the oscillation voltage (14) of the power source circuit 120 falls down.

After time t5, operation similar to the operation from time t1 to time t5 is repeated.

As described above, the oscillation voltage (1) of the power source circuit 110 and the oscillation voltage (14) of the power source circuit 120 are opposite in phase. In other words, the signal generating circuit 150 may generate, based on the oscillation voltage (1) of the power source circuit 110, the oscillation control signal to be a reference of the timing of switching the power source circuit 120 such that the oscillation voltage (1) of the power source circuit 110 and the oscillation voltage (14) of the power source circuit 120 become opposite in phase.

This is because the timing, at which the input signal (4) of the inverting input terminal (−) of the comparator 151 decreases to be equal the input signal (5) of the non-inverting input terminal (+) of the comparator 151, is detected at the timing moved forward, by the half of the pulse width of the H level of the oscillation voltage (14), from the timing at which the oscillation timing signal (2) decreases to be equal to the output voltage of the power source circuit 110 illustrated by the broken line.

Thus, the centers of the pulse widths of the H level of the oscillation voltage (1) of the power source circuit 110 and the centers of the pulse widths of the H level of the oscillation voltage (14) of the power source circuit 120 are different in phase by 180 degrees.

Although the signal generating circuit 150 coupled to the power source circuit 120 has been described here, in the signal generating circuit 150 coupled to the power source circuit 130, an offset of the level of the input signal (5) of the non-inverting input terminal (+) of the comparator 151 with respect to the voltage (3) of the reference voltage source 152 is set to be a value corresponding to the half of the output voltage (3.3 V) of the power source circuit 130.

Thus, the centers of the pulse widths of the H level of the oscillation voltage (1) of the power source circuit 110 and the centers of the pulse widths of the H level of the oscillation voltage (14) of the power source circuit 130 are different in phase by 180 degrees.

Further, in the signal generating circuit 150 coupled to the power source circuit 140, an offset of the level of the input signal (5) of the non-inverting input terminal (+) of the comparator 151 with respect to the voltage (3) of the reference voltage source 152 is set to be a value corresponding to the half of the output voltage (5 V) of the power source circuit 140.

Thus, the centers of the pulse widths of the H level of the oscillation voltage (1) of the power source circuit 110 and the centers of the pulse widths of the H level of the oscillation voltage (14) of the power source circuit 140 are different in phase by 180 degrees.

Figure 6:
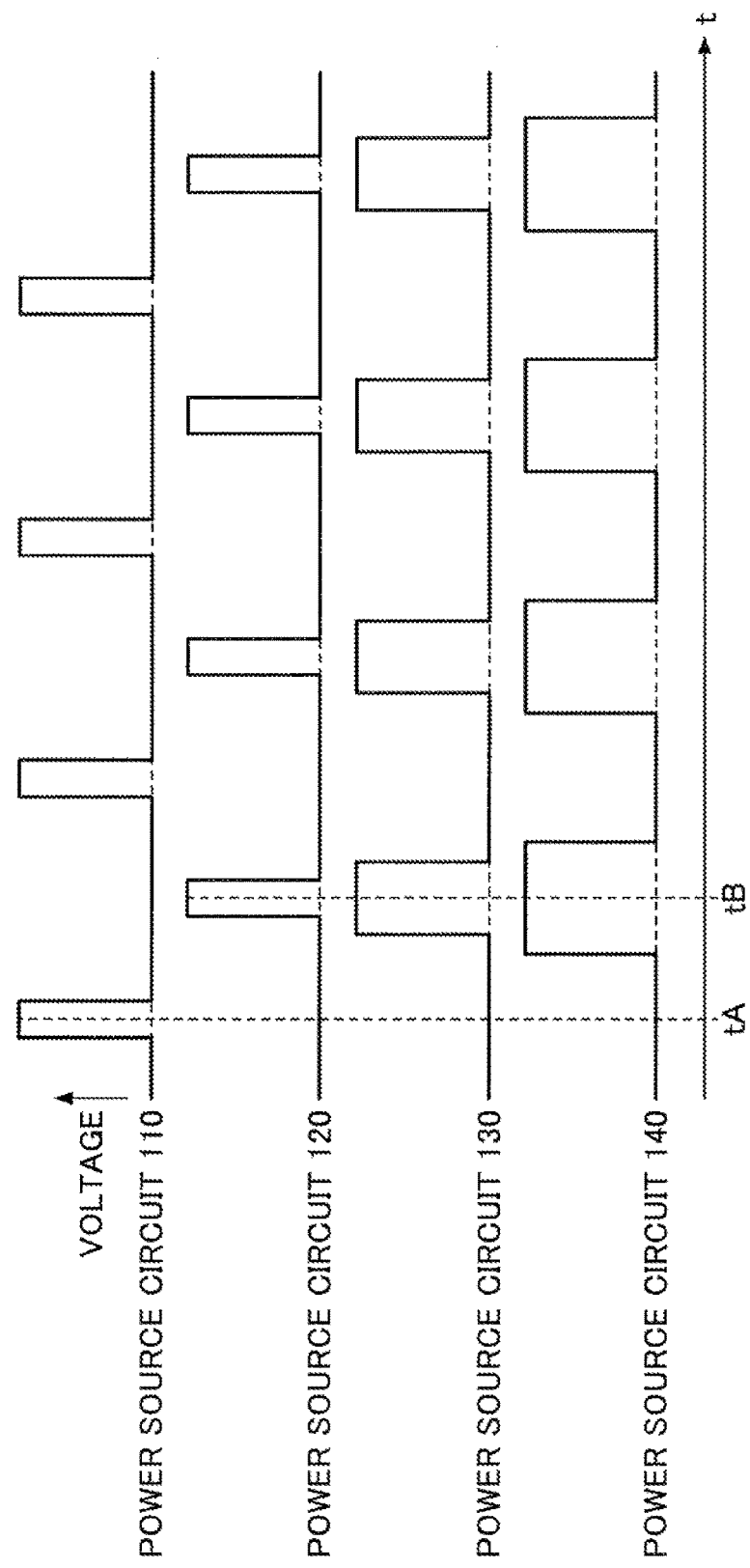
FIG. 6 is a diagram illustrating an oscillation voltage of the power source circuit 110 and oscillation voltages of power source circuits 120, 130, 140 according to the first embodiment.

FIG. 6 is a diagram illustrating the oscillation voltages of the power source circuits 110, 120, 130, 140. As illustrated in FIG. 6, in the oscillation voltages of the power source circuits 110, 120, 130, 140, the pulse widths become wider as the output voltages of the power source circuits 110, 120, 130, 140 increase, respectively.

In FIG. 6, time tA is a timing of the center of a zone in a time width direction where the oscillation voltage of the power source circuit 110 rises to the H level. Further, in FIG. 6, time tB is a timing of the center of the zone in the time width direction where the oscillation voltage of each of the power source circuits 120, 130, and 140 rises to the H level.

In the cycles of the oscillation voltages of the power source circuits 110, 120, 130, and 140, time tA and time tB are different in phase by the half cycle (180 degrees).

Figure 7:
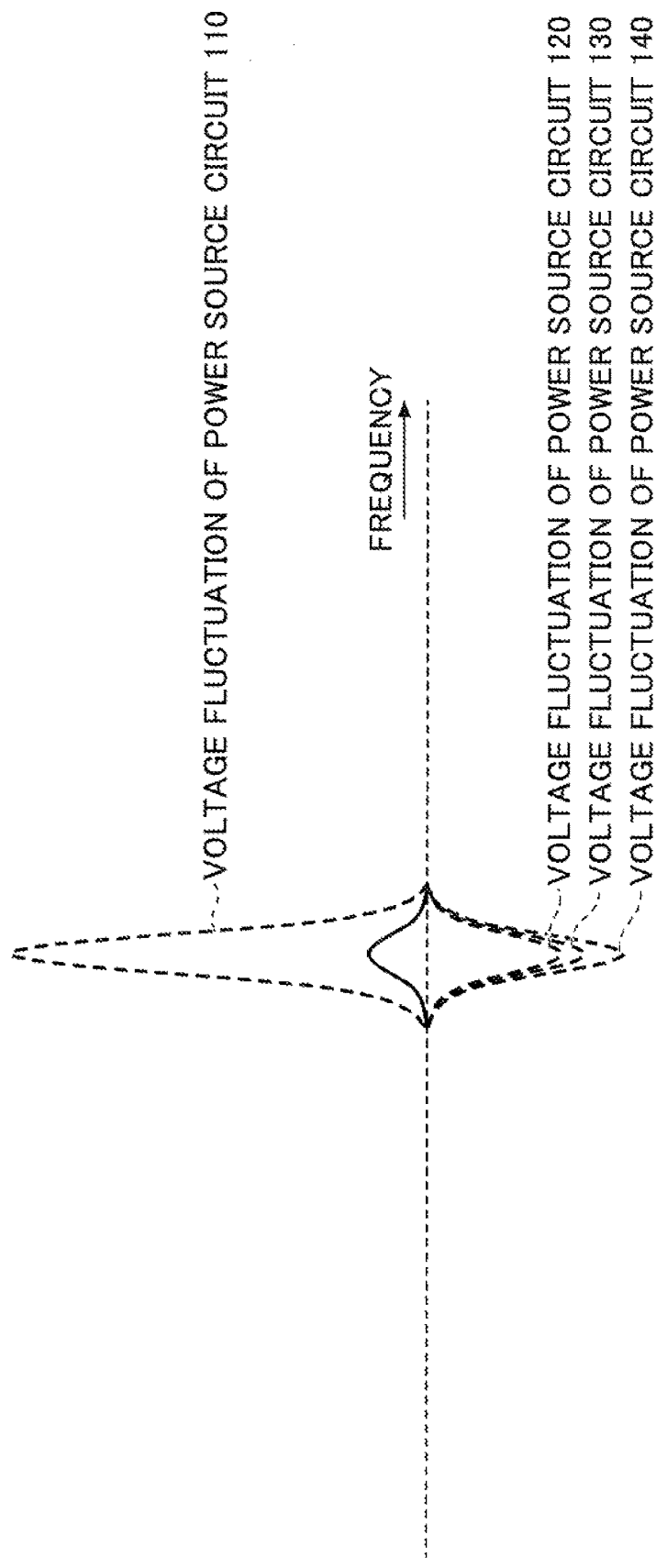
FIG. 7 is a diagram illustrating levels of voltage fluctuations in input units of the power source circuits 110, 120, 130, and 140 according to the first embodiment.

FIG. 7 is a diagram illustrating levels of the voltage fluctuations in the input units of the power source circuits 110, 120, 130, and 140. In FIG. 7, a lateral axis represents a frequency and a vertical axis represents a voltage fluctuation's level (voltage value).

The input units of the power source circuits 110, 120, 130, and 140 are the voltage fluctuations in the input unit 111 of the power source circuit 110 (see FIG. 2), the input unit 121 of the power source circuit 120 (see FIG. 3), and the input units in the power source circuits 130 and 140. The input units of the power source circuits 130 and 140 are similar to the input unit 121 of the power source circuit 120 (see FIG. 3).

Because the power source circuits 110, 120, 130, and 140 are switched at the equal frequency, the positions of the voltage fluctuations in the input units of the power source circuits 110, 120, 130, and 140 are equal in the lateral direction.

Further, the voltage fluctuations in the input units of the power source circuits 120, 130, and 140 occur in opposite phases to the voltage fluctuation of the input unit of the power source circuit 110. Accordingly, in FIG. 7, the voltage fluctuation in the input unit of the power source circuit 110 is represented by a positive value in the vertical direction, and the voltage fluctuations in the input units of the power source circuits 120, 130, and 140 are represented by negative values in the vertical direction.

Because the CPU 10 is coupled to the power source circuit 110, the voltage fluctuation of the input unit 111 is largest. Further, the voltage fluctuations of the input units of the power source circuits 120, 130, and 140, to which the memory 20, the logic IC 30, and the HDD 40 are respectively coupled, are smaller than the voltage fluctuation of the input unit 111.

The level illustrated by the solid line is obtained by adding all voltage fluctuations in the input units of the power source circuits 110, 120, 130, and 140. Thus, the voltage fluctuation generated in the wiring 102 of the power source apparatus 100 is the level illustrated by the solid line in FIG. 7. As illustrated in FIG. 7, the level illustrated by the solid line is smaller in absolute value than the voltage fluctuations in the input units of the respective power source circuits 110, 120, 130, and 140.

This is because the total value of the voltage fluctuations is reduced by canceling each other out because the voltage fluctuations in the input units of the power source circuits 120, 130, and 140 occur in opposite phases to the voltage fluctuation of the input unit of the power source circuit 110. Thus, it is possible to take measures against noise.

As described above, according to the first embodiment, it becomes possible to provide the power source apparatus 100 that can perform a measure against noise.

<Second Embodiment>

A power source apparatus according to a second embodiment has a configuration, in which the power source circuit 110 of the power source apparatus 100 of the first embodiment is replaced with a power source circuit 210 and the signal generating circuit 150 is replaced with a signal generating circuit 250. That is, the power source apparatus of the second embodiment includes power source circuits 210, 120, 130, and 140 and the signal generating circuit 250.

Figure 8:
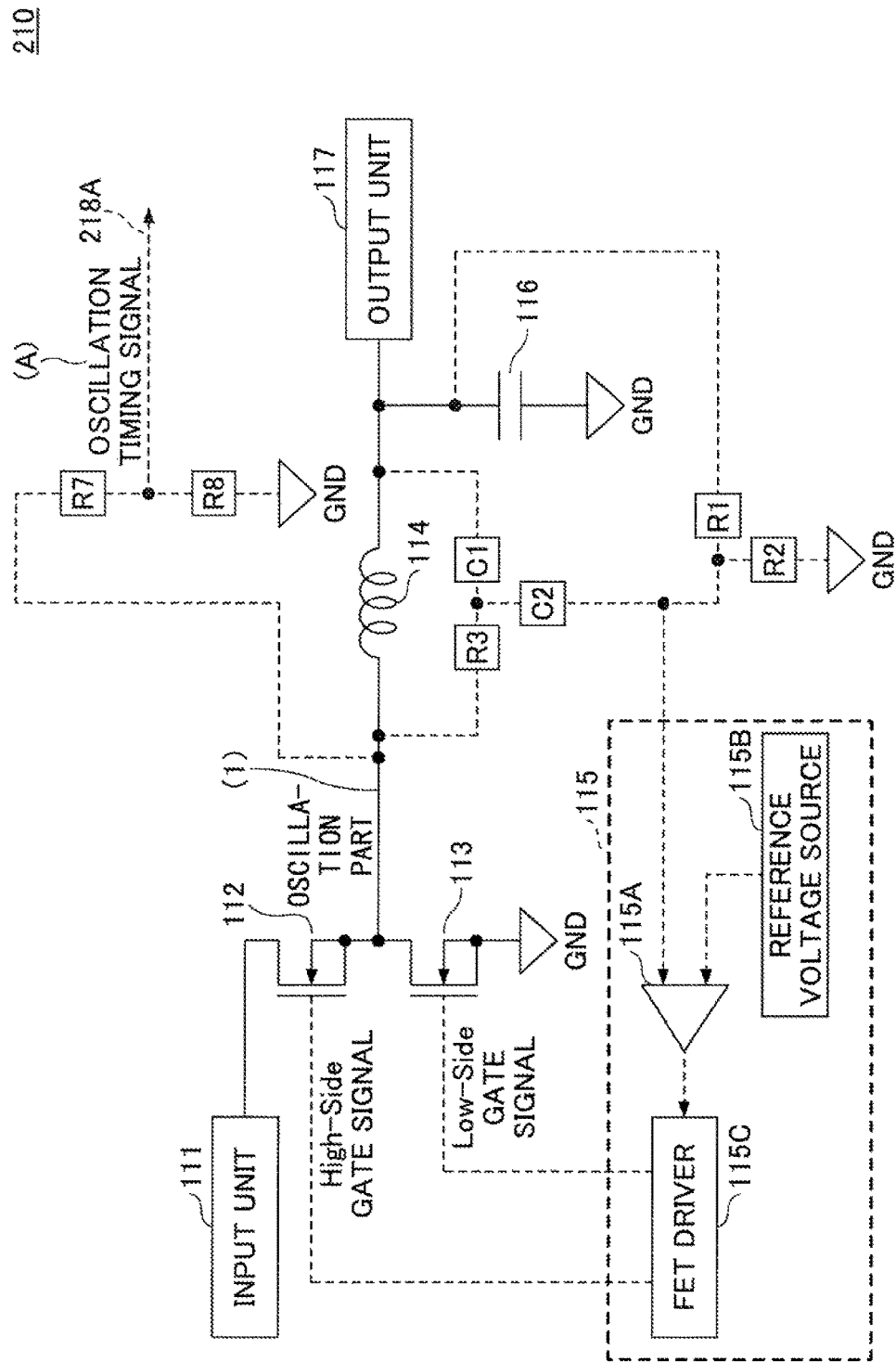
FIG. 8 is a diagram illustrating a configuration of a power source circuit 210 according to a second embodiment.

FIG. 8 is a diagram illustrating a configuration of the power source circuit 210.

The power source circuit 210 has a configuration, in which the arrangement of the resistor R4, the capacitor C4, and the wiring 118A of the power source circuit 110 of the first embodiment is changed. Because other elements of the power source circuit 210 are similar to the elements of the power source circuit 110, the same reference numbers are given to the similar elements and their descriptions are omitted as appropriate.

The power source circuit 210 includes the input unit 111, the FETs 112 and 113, the coil 114, the control IC 115, the output capacitor 116, the output unit 117, a wiring 218A, resistors R1, R2, R3, R7, and R8, and capacitors C1 and C2. In FIG. 8, thin dash lines represent signal lines.

The resistors R7 and R8 are coupled in series between the oscillation part and ground (GND). The wiring 218A branches from between the resistors R7 and R8. The wiring 218A outputs the oscillation timing signal to the signal generating circuit 250 (see FIG. 10).

Figure 9:
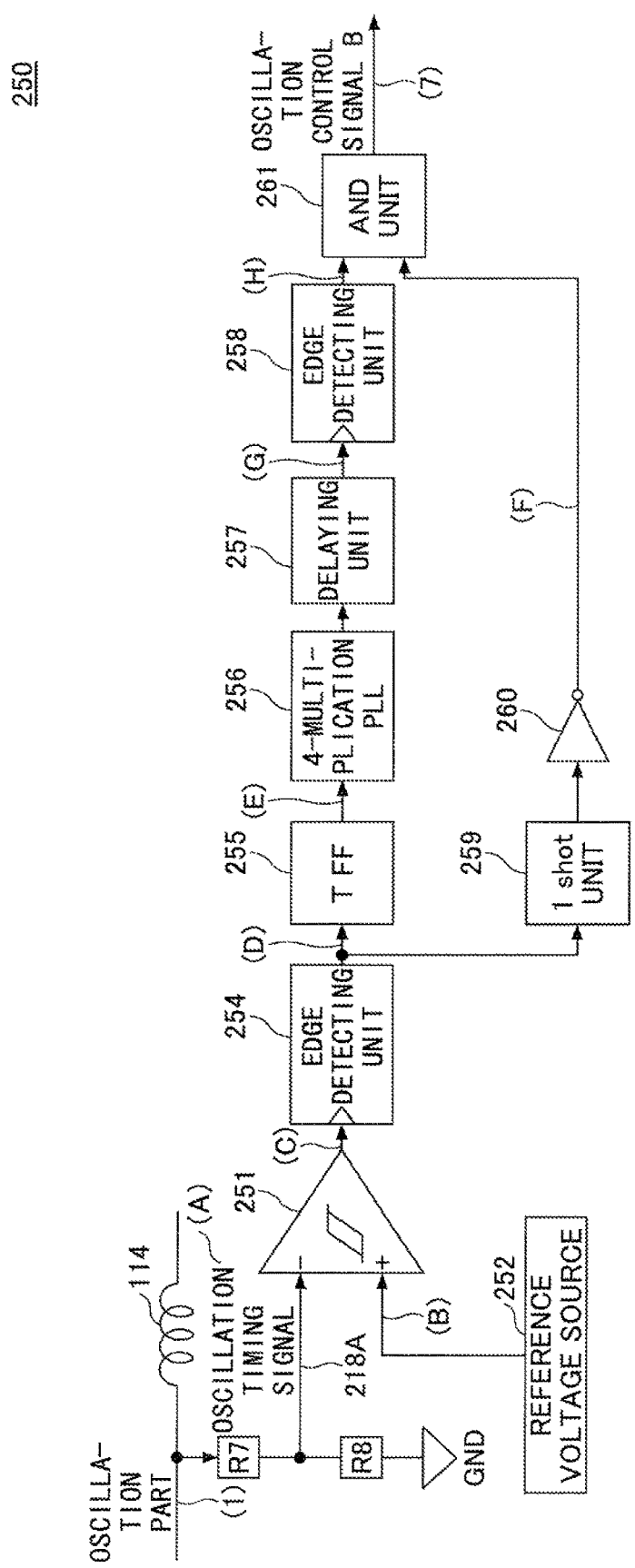
FIG. 9 is a diagram illustrating a configuration of the signal generating circuit according to the second embodiment.

FIG. 9 is a diagram illustrating a configuration of the signal generating circuit 250. Here, the signal generating circuit 250 coupled to the power source circuit 120 will be described. Three signal generating circuits 250 are provided for the respective power source circuits 120, 130, and 140 in practice. The signal generating circuit 250 coupled to the power source circuit 130 and the signal generating circuit 250 coupled to the power source circuit 140 have a configuration similar to that of the signal generating circuit 250 coupled to the power source circuit 120. However, setting of a delay time is different. Such a difference will be described below.

The signal generating circuit 250 includes a comparator 251, a reference voltage source 252, an edge detecting unit 254, a T-type Flip Flop (FF) 255, a 4-multiplication Phase Locked Loop (PLL) 256, a delaying unit 257, an edge detecting unit 258, an 1 shot unit 259, an inverter 260, and an AND unit 261.

The comparator 251 includes an inverting input terminal (−) coupled to a coupling point of the resistors R7 and R8, and a non-inverting input terminal (+) coupled to the reference voltage source 252. The comparator 251 compares levels of signals that are input to the inverting input terminal (−) and the non-inverting input terminal (+), and outputs, to the edge detecting unit 254, an output signal. The comparator 251 is an example of a comparing unit.

The reference voltage source 252 outputs a predetermined reference voltage to the non-inverting input terminal (+) of the comparator 251. The comparator 251 may compare the oscillation voltage of the power source circuit 210 with a predetermined comparison value.

The edge detecting unit 254 detects a rising edge included in the output voltage of the comparator 251, and outputs, to the T-type FF 255 and the 1 shot unit 259, a pulse signal of H level at the timing of rising. A pulse width of the H level of the pulse signal that the edge detecting unit 254 outputs is significantly short and instantaneously falls to L level. The edge detecting unit 254 is an example of a first edge detecting unit.

Every time a pulse signal of the H level is input from the edge detecting unit 254, the T-type FF 255 alternately switches the level of the output signal between the H level and the L level to output the signal to the 4-multiplication PLL 256. Thus, every time the pulse signal of the H level is input from the edge detecting unit 254, the output signal of the T-type FF 255 is alternately switched between the H level and the L level. When an edge of the output of the comparator 251 is detected by the edge detecting unit 254, the T-type FF 255 may output a first pulse signal in which the H level and the L level are switched.

The 4-multiplication PLL 256 outputs the pulse signal obtained by multiplying the frequency of the output signal of the T-type FF 255 by 4.

The delaying unit 257 gives a predetermined delay time to the pulse signal output from the 4-multiplication PLL 256, and outputs the signal. The predetermined delay time is set in order to obtain the pulse of the H level of the oscillation control signal (7) at the same timing of the pulse of the H level of the oscillation control signal (7) in the first embodiment. The predetermined delay time will be described later below with reference to FIG. 10.

The edge detecting unit 258 detects an edge of rising to the H level of the pulse signal delayed by and output from the delaying unit 257 and outputs, to the AND unit 261, a pulse signal of the H level synchronized with the edge of rising. A pulse width of the H level of the pulse signal that the edge detecting unit 258 outputs is significantly short and instantaneously falls to L level. The edge detecting unit 258 is an example of a second edge detecting unit.

Every time a pulse signal of the H level is input from the edge detecting unit 254, the 1 shot unit 259 outputs a pulse signal having a predetermined pulse width of the H level. A one-shot circuit, which detects a pulse signal of H level from the edge detecting unit 254 and outputs a pulse signal having a predetermined pulse width of H level, may be used as the 1 shot unit 259. The predetermined pulse width of the H level that the 1 shot unit 259 outputs may be less than a half of one cycle of the oscillation voltage of the power source circuit 110. For example, the predetermined pulse width of the H level that the 1 shot unit 259 outputs may be about a quarter of one cycle of the oscillation voltage of the power source circuit 110.

The inverter 260 inverts the pulse signal of the predetermined pulse width of the H level output from the 1 shot unit 259, and outputs the signal. The inverter 260 is an example of an inverting unit.

The AND unit 261 outputs the pulse signal of the signal level represented by the logical AND of the pulse signal input from the edge detecting unit 258 and the pulse signal input from the inverter 260. The pulse signal that the AND unit 261 outputs becomes the oscillation control signal B. The AND unit 261 is an example of a logical AND output unit.

Figure 10:
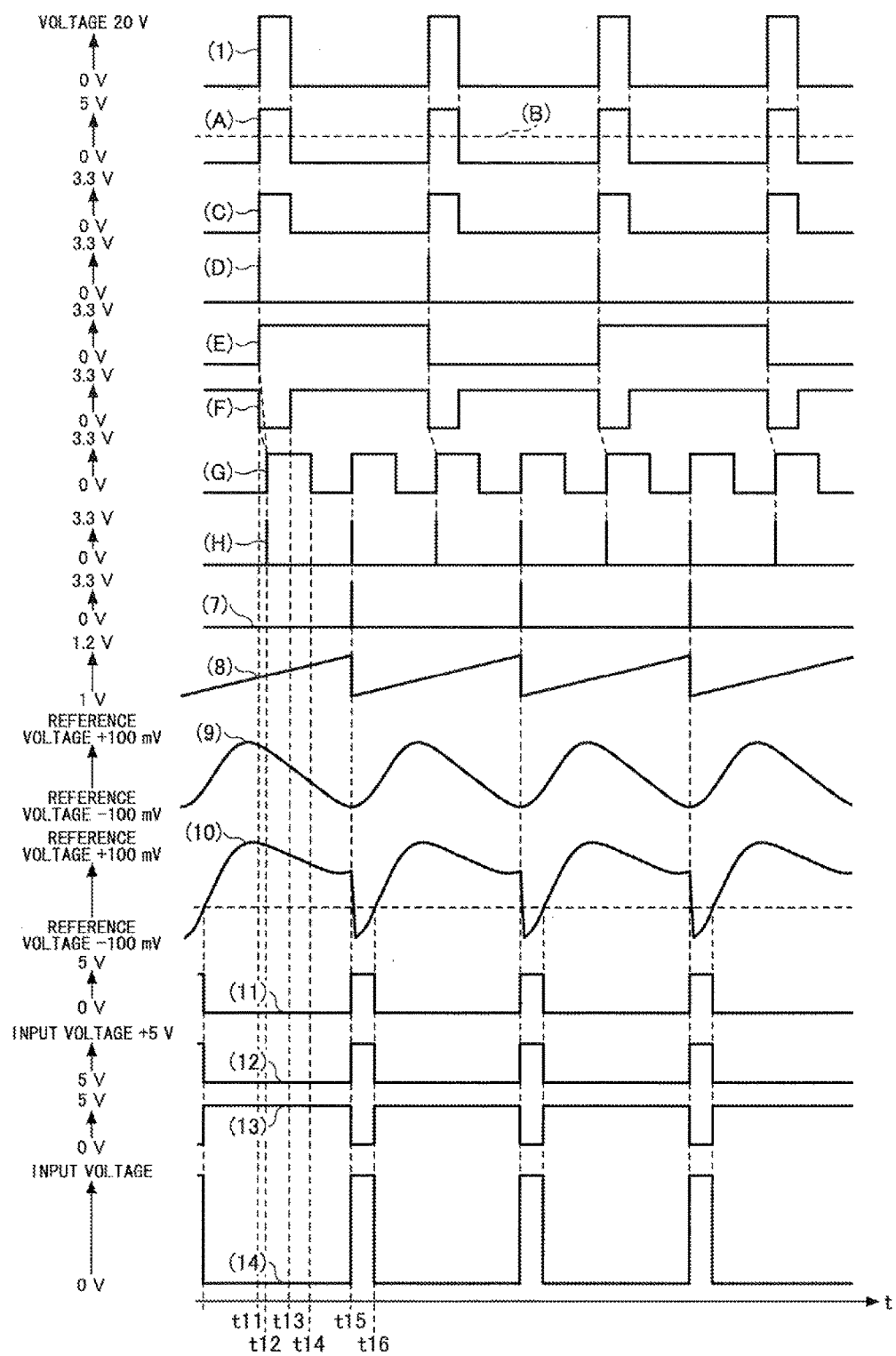
FIG. 10 is a timing chart illustrating operation realized by the power source circuit 210, the power source circuit 120, and the signal generating circuit 250 of the power source apparatus according to the second embodiment.

FIG. 10 is a timing chart illustrating operation realized by the power source circuit 210, the power source circuit 120, and the signal generating circuit 250 of the power source apparatus according to the second embodiment.

Here, an operation in a case of using the power source circuit 120 will be described. Although operations in cases of using the power source circuits 130 and 140 are similar to the operation in the case of using the power source circuit 120, differences with the case of using the power source circuit 120 will described below.

Signals (1), (A) to (H), and (7) to (14) illustrated in FIG. 10 are the signals (1), (A) to (H), and (7) to (14) illustrated in FIG. 8 and FIG. 9.

Specifically, the signal (1) represents a voltage waveform of the oscillation part of the power source circuit 210 (see FIG. 8). The signal (1) is input to the resistor R7. The signal (A) represents a voltage waveform of the oscillation timing signal (see FIG. 8). The signal (A) represents a voltage waveform of the input signal of the inverting input terminal (−) of the comparator 251 (see FIG. 9).

The signal (B) represents a voltage waveform of the reference voltage source 252 (see FIG. 9). The signal (B) represents a voltage waveform of the input signal of the non-inverting input terminal (+) of the comparator 251 (see FIG. 9)

The signal (C) represents a voltage waveform of the output signal of the comparator 251. The signal (D) represents a voltage waveform of the output signal of the edge detecting unit 254 (see FIG. 9). The signal (E) represents a voltage waveform of the output signal of the T-type FF 255 (see FIG. 9).

The signal (E) represents a voltage waveform of the output signal of the 4-multiplication PLL 256 (see FIG. 9). The signal (F) represents a voltage waveform of the output signal of the inverter 260 (see FIG. 9). The signal (G) represents a voltage waveform of the output signal of the delaying unit 257 (see FIG. 9). The signal (H) represents a voltage waveform of the output signal of the edge detecting unit 258 (see FIG. 9).

The signal (7) represents a voltage waveform of the oscillation control signal B (see FIG. 9). The signals (8) to (14) are similar to the signals of the first embodiment.

In the following, the signals (1), and (A) to (E) are respectively referred to as the oscillation voltage (1) of the power source circuit 210, the oscillation timing signal (A), the voltage (B) of the reference voltage source 252, the output signal (C) of the comparator 251, the output signal (D) of the edge detecting unit 254, and the output signal (E) of the T-type FF 255.

Further, the signals (F) to (H) are respectively referred to as the output signal (F) of the inverter 260, the output signal (G) of the delaying unit 257, and the output signal (H) of the edge detecting unit 258.

In a scale illustrated for the oscillation timing signal (A), H level is 5 V and L level is 0 V. Further, in scales illustrated for the output signal (C) of the comparator 251, the output signal (D) of the edge detecting unit 254, the output signal (E) of the T-type FF 255, the output signal (F) of the inverter 260, the output signal (G) of the delaying unit 257, and the output signal (H) of the edge detecting unit 258, H level is 3.3 V and L level is 0 V.

At time t11, the high side FET 112 is turned on and the low side FET 113 is turned off, and the oscillation voltage (1) of the power source circuit 210 rises to the H level. Then, the oscillation timing signal (A), whose voltage is divided by the resistors R7 and R8, becomes higher than the voltage (B) of the reference voltage source 252. Further, the output signal (C) of the comparator 251 rises to the H level in synchronization with the oscillation voltage (1) at time t11.

It should be noted that the voltage (B) of the reference voltage source 252 may be set to be an appropriate value such that the pulse of the H level of the output signal (C) of the comparator 251 that is in synchronization with the pulse of the H level of the oscillation voltage (1) of the power source circuit 210 is obtained even if either a battery or an AC adapter is coupled to the input terminal of the power source apparatus according to the second embodiment. The comparator 251 is provided in order to eliminate an influence due to the difference of the input voltage when the battery or the AC adaptor is coupled to the input terminal.

Further, at time t11, the output signal (C) of the comparator 251 rises to the H level. Thereby, the output signal (D) of the edge detecting unit 254 becomes the H level. After the lapse of time t11, the output signal (D) of the edge detecting unit 254 falls to the L level instantly.

Further, at time t11, the output signal (D) of the edge detecting unit 254 becomes the H level so that the output signal (E) of the T-type FF 255 rises to the H level and the output signal (F) of the inverter 260 falls to the L level.

The output signal (G) of the delaying unit 257 rises to the H level at time t12 after the lapse of the delay time, set by the delaying unit 257, from time t11. The frequency of the output signal (G) of the delaying unit 257 is 4 times of that of the output signal (E) of the T-type FF 255 by the 4-multiplication PLL 256. Further, the output signal (G) of the delaying unit 257 is delayed with respect to the output signal (E) of the T-type FF 255 for the delay time set by the delaying unit 257.

It should be noted that the delay time set by the delaying unit 257 is a time obtained by subtracting a time corresponding to one cycle of the output signal (G) of the delaying unit 257 from a time from time t1 at which the oscillation voltage (1) of the power source circuit 110 rises to time t4 at which the pulse of the H level of the oscillation control signal (7) is output in the first embodiment.

That is, the delay time set by the delaying unit 257 of the signal generating circuit 250 coupled to the power source circuit 120 is a time obtained by subtracting the time of the half of the pulse width of the H level of the oscillation voltage (1) of the power source circuit 110 from the time of the half of the pulse width of the H level of the oscillation voltage (14) of the power source circuit 120. In other words, the delay time, which the delaying unit 257 gives to the oscillation voltage (1) of the power source circuit 110, may be a difference between the time of the half of the pulse width of the H level of the oscillation voltage (1) of the power source circuit 110 and the time of the half of the pulse width of the H level of the oscillation voltage (14) of the power source circuit 120.

Further, at time t12, the output signal (G) of the delaying unit 257 rises to the H level so that the output signal (H) of the edge detecting unit 258 becomes the H level. After the lapse of time t12, the output signal (H) of the edge detecting unit 258 falls to the L level instantly.

At time t12, the oscillation control signal (7) output from the AND unit 261 is in the L level because the output signal (F) of the inverter 260 is in the L level even when the output signal (H) of the edge detecting unit 258 becomes the H level.

At time t13, the output signal (F) of the inverter 260 rises to the H level. This is because the period during which the output signal of the 1 shot unit 259 is held at the H level ends, and it falls to the L level.

At time t14, the output signal (G) of the delaying unit 257 falls to the L level.

At time t15, when the output signal (G) of the delaying unit 257 rises to the H level, the output signal (H) of the edge detecting unit 258 becomes the H level and the oscillation control signal (7) output from the AND unit 261 rises to the H level. This timing at which the oscillation control signal (7) rises to the H level is equal to the timing at which the oscillation control signal (7) rises to the H level at time t4 in the first embodiment. This is because the delay time by the delaying unit 257 is used as described above.

Further, at time t15, when the pulse of the H level occurs in the oscillation control signal (7), similar to the first embodiment, because the triangular wave generating circuit 128 outputs the voltage in triangular wave, the output voltage (8) of the triangular wave generating circuit 128 starts to rise from the level at which the level of the triangle wave is lowest.

Further, the one input voltage (10) of the comparator 125A becomes the voltage waveform obtained by superimposing the output voltage (8) of the triangular wave generating circuit 128 with the output voltage (9) of the power source circuit 120, and becomes lower than the reference voltage of the reference voltage source 125B at time t15.

Thus, at time t15, the output signal (11) of the comparator 125A becomes the H level, and the FET driver 125C increases the High-Side gate signal (12) to the H level and decreases the Low-Side gate signal (13) to the L level. This is to increase the voltage value of the DC power that is output from the output unit 127.

As a result, at time t15, the oscillation voltage (14) of the power source circuit 120 rises. The operation in time t15 according to the second embodiment is similar to the operation in time t4 according to the first embodiment.

When the one input voltage (10) of the comparator 125A exceeds the reference voltage of the reference voltage source 125B at time t16, the output signal (11) of the comparator 125A falls to the L level. Thus, the FET driver 125C decreases the High-Side gate signal (12) to the L level and increases the Low-Side gate signal (13) to the H level. This is to decrease the voltage value of the DC power that is output from the output unit 127.

As a result, at time t16, the oscillation voltage (14) of the power source circuit 120 falls.

After time t16, operation similar to the operation from time t11 to time t15 is repeated.

As described above, the oscillation voltage (1) of the power source circuit 210 and the oscillation voltage (14) of the power source circuit 120 are opposite in phase.

This is because the phase of the center of the pulse width of the H level of the oscillation voltage (1) of the power source circuit 210 and the phase of the center of the pulse width of the H level of the oscillation voltage (14) of the power source circuit 120 become opposite by setting the delay time by the delaying unit 257 of the signal generating circuit 250 as described above.

The signal generating circuit 250 coupled to the power source circuit 120 has been described here. A delay time set by the delaying unit 257 of the signal generating circuit 250 coupled to the power source circuit 130 is as follows. The delay time set by the delaying unit 257 of the signal generating circuit 250 coupled to the power source circuit 130 is a time obtained by subtracting a time corresponding to one cycle of the output signal (G) of the delaying unit 257 from a time from time t1 at which the oscillation voltage (1) of the power source circuit 110 rises to time t4 at which pulse of the H level of the oscillation control signal (7) is output in the signal generating circuit 150 coupled to the power source circuit 130 the first embodiment.

In other words, the delay time set by the delaying unit 257 of the signal generating circuit 250 coupled to the power source circuit 130 is a time obtained by subtracting the time of the half of the pulse width of the H level of the oscillation voltage (1) of the power source circuit 110 from the time of the half of the pulse width of the H level of the oscillation voltage (14) of the power source circuit 130.

Further, the delay time set by the delaying unit 257 of the signal generating circuit 250 coupled to the power source circuit 140 is a time obtained by subtracting a time corresponding to one cycle of the output signal (G) of the delaying unit 257 from a time from time t1 at which the oscillation voltage (1) of the power source circuit 110 rises to time t4 at which the pulse of the H level of the oscillation control signal (7) is output in the signal generating circuit 150 coupled to the power source circuit 140 the first embodiment.

In other words, the delay time set by the delaying unit 257 of the signal generating circuit 250 coupled to the power source circuit 140 is a time obtained by subtracting the time of the half of the pulse width of the H level of the oscillation voltage (1) of the power source circuit 110 from the time of the half of the pulse width of the H level of the oscillation voltage (14) of the power source circuit 140.

Accordingly, the oscillation voltage (1) of the power source circuit 210 and the oscillation voltages (14) of the power source circuits 120, 130, and 140 are opposite in phase.

Thus, the voltage fluctuations in the input units of the power source circuits 120, 130, and 140 occur in opposite phases to the voltage fluctuation of the input unit in the power source circuit 110, and the total value is reduced by canceling each other out. Thus, it is possible to take measures against noise.

As described above, according to the second embodiment, it becomes possible to provide the power source apparatus that can perform a measure against noise.

As described above, examples of a power source apparatus according to the embodiments of the present invention have been described. However, the present invention is not limited to the embodiments specifically disclosed and various variations and modifications may be made without departing from the scope of the present invention.

Although examples of a power receiver according to the embodiments of the present invention have been described, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A power source apparatus comprising:
a power input terminal to which input direct-current power is input from a power source;
a first switching regulator coupled to the power input terminal and configured to supply, to a first electronic component, first direct-current power obtained by converting a voltage of the input direct-current power into a first voltage;
a second switching regulator coupled to the power input terminal and configured to supply, to a second electronic component, second direct-current power obtained by converting the voltage of the input direct-current power into a second voltage; and
a signal generating circuit configured to generate, based on a first oscillation voltage of the first switching regulator, a reference signal to be a reference of a timing of switching the second switching regulator such that the first oscillation voltage of the first switching regulator and a second oscillation voltage of the second switching regulator become opposite in phase,
wherein the signal generating circuit includes
a hysteresis comparator configured to compare a voltage that is in accordance with the first oscillation voltage with a reference voltage,
an increasing unit configured to increase a voltage value of the reference voltage by a value corresponding to a half of a pulse width of the second oscillation voltage, and
an edge detecting unit configured to detect an edge of an output of the hysteresis comparator when the voltage that is in accordance with the first oscillation voltage decreases,
wherein the reference signal is the edge that is detected by the edge detecting unit.

2. The power source apparatus according to claim 1, wherein a voltage fluctuation of the first electronic component is larger than a voltage fluctuation of the second electronic component.

3. A power source apparatus comprising:
a power input terminal to which input direct-current power is input from a power source;
a first switching regulator coupled to the power input terminal and configured to supply, to a first electronic component, first direct-current power obtained by converting a voltage of the input direct-current power into a first voltage;
a second switching regulator coupled to the power input terminal and configured to supply, to a second electronic component, second direct-current power obtained by converting the voltage of the input direct-current power into a second voltage; and
a signal generating circuit configured to generate, based on a first oscillation voltage of the first switching regulator, a reference signal to be a reference of a timing of switching the second switching regulator such that the first oscillation voltage of the first switching regulator and a second oscillation voltage of the second switching regulator become opposite in phase,
wherein the signal generating circuit includes
a comparing unit configured to compare the first oscillation voltage with a predetermined comparison value,
a first edge detecting unit configured to detect an edge of an output of the comparing unit,
a T-type flip flop configured to output, when the edge is detected by the first edge detecting unit, a first pulse signal in which a H level and a L level are switched,
a multiplier configured to output a second pulse signal obtained by multiplying a frequency of the first pulse signal output from the T-type flip flop by 4,
a delaying unit configured to give a delay time to the second pulse signal, a second edge detecting unit configured to detect an edge of the second pulse signal delayed by the delaying unit, an one-shot unit coupled, on an output side of the first edge detecting unit, to the first edge detecting unit in parallel with the T-type flip flop and configured to output a third pulse signal having a predetermined pulse width when the edge is detected by the first edge detecting unit, an inverting unit configured to output a fourth pulse signal obtained by inverting the third pulse signal, and a logical AND output unit configured to output the reference signal as a logical AND of the output of the first edge detecting unit and the fourth pulse signal, wherein the delay time, which the delaying unit gives to the first oscillation voltage, is a difference between a first time of a half of a pulse width of a H level of the first oscillation voltage and a second time of a half of a pulse width of a H level of the second oscillation voltage.

4. The power source apparatus according to claim 3, wherein a voltage fluctuation of the first electronic component is larger than a voltage fluctuation of the second electronic component.

* * * * *